June 25, 1957     H. NOYES ET AL     2,797,178
CONTAINER CONSTRUCTION AND METHOD OF MANUFACTURE
Filed Sept. 12, 1952
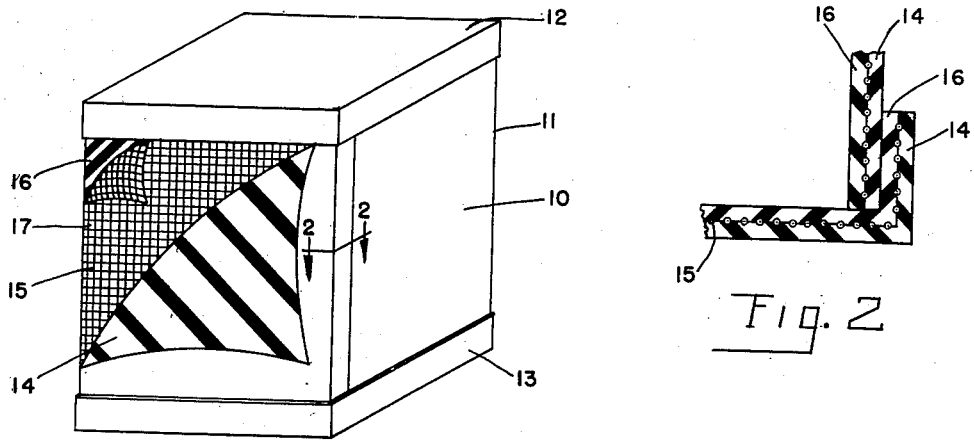
Fig. 1
Fig. 2
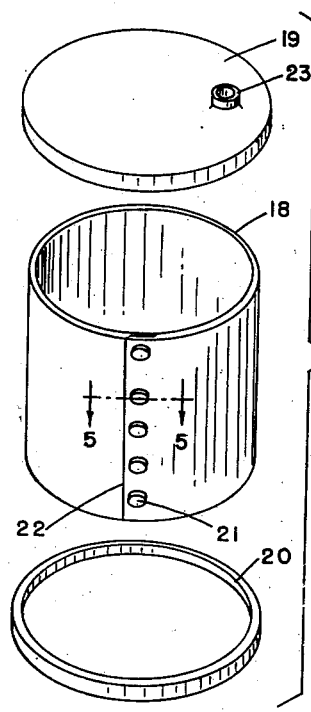
Fig. 3
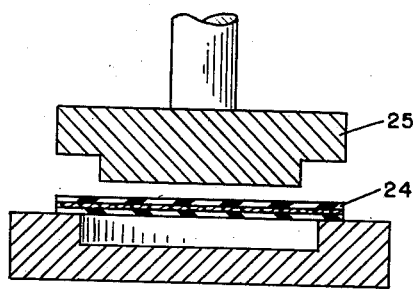
Fig. 4
INVENTOR.
HOWARD NOYES
BY GILBERT V. SOPER
ATT'Y.

June 25, 1957   H. NOYES ET AL   2,797,178
CONTAINER CONSTRUCTION AND METHOD OF MANUFACTURE
Filed Sept. 12, 1952   2 Sheets-Sheet 2

INVENTOR.
HOWARD NOYES
BY GILBERT V. SOPER
ATT'Y.

United States Patent Office 2,797,178
Patented June 25, 1957

2,797,178

CONTAINER CONSTRUCTION AND METHOD OF MANUFACTURE

Howard Noyes and Gilbert V. Soper, Dayton, Ohio, assignors to The Dayton Rubber Company, a corporation of Ohio Application September 12, 1952, Serial No. 309,282

7 Claims. (Cl. 154—83)

This invention relates to containers, and more particularly to containers composed of a metal reinforced rubber sheeting or a foraminous metal coated with resinous material. This invention also relates to the method of manufacturing such containers.

In the past, a wide variety of containers used in aeronautical, automotive, and other industrial fields have been fabricated from sheet metal. These tanks have been expensive and relatively heavy in proportion to their capacity. At the same time they have been subject to corrosive effects of materials to be contained within them and of the moisture of the atmosphere within and surrounding them. Where metallic containers have been formed in intricate configurations necessitating many bends, joints, and splices, premature failure of these has frequently occurred with a resultant loss in the desired imperviousness and a corresponding reduction in the useful life of the container. Such containers have also been found to fail due to poor resistance to shocks, blows, vibration, etc.

In many instances it has been desired to provide containers having smooth and regular exterior surfaces as, for example, aeronautical drop tanks, the design of which must conform rigidly to exacting aerodynamic principles. In such cases the ordinarily satisfactory welded or riveted joints have caused critical irregularities in the surfaces of such containers, and excessive production time and labor have been involved in interior welding, countersinking rivets and other corrective measures.

Finally, because of the scarcity and uncertainty of the supply of the various metals, the choice of metal to be used in a particular container has been limited by the necessity for maintaining designated production costs and output schedules, so that savings in metal requirements has become an all important factor in the design and construction of containers.

In view of the above, it is an object of this invention to provide an impervious, corrosion-resistant container.

It is another object of the present invention to provide such a container that will have sufficient inherent rigidity and yet possess sufficient resilience and shock absorbing characteristics to resist the stresses to which it will be subjected.

It is a further object of this invention to provide a container of the type described which will require a minimum amount of metal in its construction.

It is still another object of this invention to provide a container that will have a smooth and uniform surface notwithstanding intricate configurations and multiplicity of joints and splices.

It is yet a further object of this invention to provide new and economical methods for the manufacture of these containers.

We propose to achieve these and other objects which will be apparent from the following description, by the adaptation of a foraminous metal reinforced composite sheet material to the particular demands of container construction. The use of the foraminous metal reinforcement will provide the necessary rigidity and strength in cooperation with a rubber or other flexible resinous coating, which in turn will serve to resist penetrating and corrosion of the container walls while at the same time providing desirable bending qualities to the material.

Of particular importance in the adaptation of the metal reinforced rubber or resinous material to container construction is the manner in which such material may be joined, spliced, and otherwise connected to allow for smooth and unbroken interior and exterior surfaces in even the most intricate and exacting configurations. Of equal importance are the various methods of manufacture open to the designer and engineer employing the features of this invention.

The container of the present invention then, is one having a rigid, reinforcing core of foraminous or reticulated metal covered with surface layers or films of resinous or elastomeric composition, the properties of which may be varied according to the contemplated use of the final container.

That segment of our invention which relates to the imparting of corrosion-resistant properties to a strength core encompasses the application of a wide variety of rubber-like coating materials. Included in this variety of materials are the various thermoplastic and thermosetting resinous materials such as the vinyl compounds, phenoplasts, the various styrene copolymers, nylon, and the like, as well as the well-known rubber compounds all of which are known as rubber-like materials and have special properties adaptable to containers of various types and all of which are adaptable to the methods of this invention. Throughout the remainder of this application, for the purposes of clear and concise description, reference is made to the use of rubber as the coating material as one preferred material, but it is to be understood that the rubber-like materials referred to above are included in our invention. Methods for the manufacture of this material may be briefly summarized as follows:

Method 1: Preparing vulcanized flat sheets of metal reinforced rubber; cutting, forming and shaping the same into the component parts of the desired container; and mechanically joining these parts.

Method 2: Preparing unvulcanized or partially vulcanized flat sheets of metal reinforced rubber; cutting, forming and shaping the same into the component parts of the desired container; assembling these parts and vulcanizing the container thus formed.

Method 3: Cutting, forming and shaping the component parts of the desired container from a sheet of suitable foraminous metal; assembling these parts; subjecting the assembly to a solution or dispersion of rubber composition in the form of a spray or a bath so as to coat all metal surfaces and vulcanizing the assembly.

These methods, their variations and combinations, and the nature of the containers resulting therefrom will be more readily understood by reference to the following detailed description and to the appended drawings.

In the drawings:

Figure 1 is a perspective, partially cut away, of a typical container of this invention.

Figure 2 is a horizontal section on line 2—2 showing the nature of the lapped joint of the container in Figure 1.

Figure 3 is an exploded perspective of an example of a container of our invention.

Figure 4 is a vertical section through a typical press and a layer of metal reinforced rubber to be formed thereon.

Figure 8:
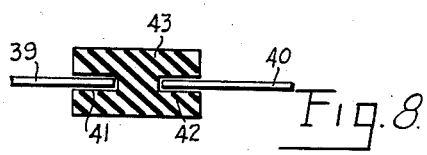
Figure 9:
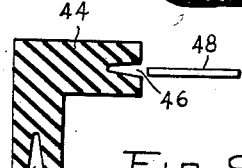
Figure 10:
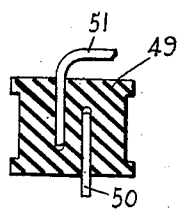

Figures 8, 9, and 10 are partially sectioned views of typical joints of the container of this invention showing a channeled gasket in cross section and the positioning of edges to be joined.

A typical container 10 of this invention as shown by Figure 1 comprises a peripheral band or sleeve 11 and two end caps 12 and 13. The band 11 may have a square cross section as shown, or any desired section such as a circle or an ellipse. The caps 12 and 13 must then be made to conform to the cross section of the band so as to form a closure when applied to the ends thereof. The material of the sleeve and caps is composed generally of an outer surface layer 14 of rubber-like material, an intermediate reinforcing layer 15 of foraminous metal, and an interior surface layer 16 of rubber composition.

The reinforcing layer 15 may be of a wire fabric as shown, or of any foraminous or reticulated metal, it being apparent that the use of such materials will allow reinforcement of a much greater area per given amount of metal than would the use of plain sheet metal, with a resultant savings in cost and weight in the finished container. The exterior surface layer 14 and the interior layer 16 may be of the same or different rubber-like compositions according to the varying conditions to which each of these surfaces will be subjected. In a fuel storage tank, for example, the interior surface layer 16 would preferably be composed of an oil-resistant rubber, such as the butadiene-acrylic nitrile copolymer known as Perbunan, while the exterior surface layer 14 would preferably be of a weather and sunlight-resistant composition, such as polychloroprene.

In a typical embodiment of this construction, we may form the interior surface layer 16 from a compound substantially as follows:

100 parts Buna-N (butadiene acrylic nitrile copolymer)
 31 parts synthetic resin reinforcer such as thermosetting phenol formaldehyde
 15 parts ester type plasticizer such as dibutyl phthalate
150 parts clay loading filler
  2 parts sulfur
  2 parts carbon black
 15 parts zinc oxide
  ½ part accelerator The exterior surface layer 14 may consist generally of the same proportions as those of the interior except that the Buna-N is replaced with 100 parts of a chloroprene polymer and a high styrene resinous reinforcer in lieu of the phenol formaldehyde.

Each of these layers, compounded as above described, is laid on a surface of the reinforcing member such as a 0.043 gauge, ½ in. mesh flattened expanded steel coated with a phenol formaldehyde solution as a bonding agent. The sandwich thus formed is then cured in a platen press for 30 minutes at 292° F. to obtain the desired Shore durometer hardness of 85 to 95.

In Figure 3 is shown the component band 18 and caps 19 and 20 of a cylindrical container as they appear prior to assembly. The container here is formed according to Method 1 above, the band and caps being formed from vulcanized sheets of metal reinforced rubber 24 in a press 25 prior to being assembled and mechanically fastened. As shown in Figure 3, the mechanical fastening may consist of a plurality of conventional rivets 21 spaced along a lapped joint 22 of the material.

Figure 5:
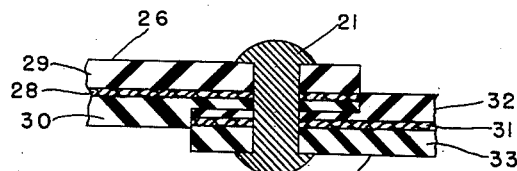
Figure 5 is an enlarged horizontal section through a joint of the container of Figure 3 taken on line 5—5.

The enlarged section of Figure 5 shows the manner in which the rivet 21 passes through two layers 26 and 27 of typical metal reinforced rubber. The heads of the rivet bear against the outer laminae 29 and 33 of the respective layers 26 and 27, while the shank of the rivet passes through an opening in the foraminous reinforcing laminae 28 and 31 of layers 26 and 27. A typical opening in such foraminous metal is shown at 17 in Figure 1.

Where the shank diameter of the rivet is larger than the interstices of the foraminous metal, a sufficiently large rivet hole may be made by joining two or more interstices. The cutting of metal involved in so joining these interstices may nominally weaken the material where the foraminous metal used is a wire fabric. It usually develops, however, that a sufficiently large rivet hole may be formed in wire fabric by simply forcing the warp and weft threads apart so that cutting of the wire threads is not necessary.

One of the desirable features of a container of our invention is the gasket-like seal which is formed about every rivet. As the two layers 26 and 27 are compressed, the rivet ends and the metal laminae 28 and 31 cooperate to cause the rubber in laminae 29, 30, 32, and 33 to expand laterally thereby firmly engaging the shank of the rivet. Alternate mechanical fastening means, such as bolts and nuts, staples, and the like, may be used for connecting the parts of this container and in most of these cases, the compressive force exerted by the fastener will result in the desirable gasket-like seal.

An alternative method of fabricating these containers comprises cutting and forming the component parts from an unvulcanized or partially vulcanized sheet of metal reinforced rubber, assembling these parts and finally vulcanizing the whole. This method has certain definite advantages in that the unvulcanized or partially vulcanized sheeting will be more pliable and can be more readily formed. At the same time, the flow of the rubber material during vulcanization will provide a perfectly closed container obviating the necessity for mechanical fastening members which, in addition to lacking the corrosion-resistant properties of the rubber layers, might constitute objectionable irregularities in the surface of the container.

In this method, the components, such as the band 11 and caps 12 and 13 of Figure 1, may be formed in the same manner as those formed from a vulcanized sheet. In this regard, it has been found that the use of a lubricant, such as water, graphite, or soapstone, upon the surfaces of the material being pressed will facilitate the shaping and create a minimum of internal stresses and separation of rubber from metal. Once formed, the parts may be assembled and held in place by a vulcanizable cement or other suitable means while they are subjected to the influence of heat and pressure for vulcanization. Where the desired final configuration will allow, the unvulcanized or partially vulcanized rubber may be placed about the foraminous metallic sheet within a suitable mold so that, upon the application of heat and pressure within the mold, the components of the container may be formed, connected, and vulcanized in a single operation. The integrated construction resulting from this method is exemplified by the lap joint of the band 11 of the container of Figure 1 which is shown in enlarged horizontal section in Figure 2. As can be seen from Figure 2, the lapping of the metal reinforced rubber sheet in its unvulcanized or partially vulcanized state, places the inner rubber layer 16 of the lapping portion of the band 11 in contiguous planar relation with the outer rubber layer 14 of the lapped portion of the band. Upon the application of vulcanizing heat and pressure, the plastic flow of the rubber material will cause layers 14 and 16 to form a unitary mass in the area of their engagement. The joint thus formed will therefore be as strong as the material of the layers so joined, and the fusion of these two layers will insure a perfect sealing of the joint to provide a container having the desired imperviousness. Where different types of rubber are present in the respective layers to be joined in this manner, it has been found desirable to apply a rubber cement or similar vulcanizable adhesive material to the portions of the layers to be united before the application of heat and pressure.

In a variation of this method involving two phases of vulcanization in a water curing apparatus, the rubber and metallic layers may be pressed together and partially vulcanized so as to form a homogeneous composite material. In this partially cured state, the sheet material is shaped to form the components of the desired container, and these are in turn cemented in assembled relation with a vulcanizable adhesive. The container is then sealed by plugging any filler holes or similar openings and the sealed interior is exposed to a source of compressed air. While so exposed, the container is placed in a suitable water curing apparatus where a pressure differential is maintained between the compressed air within and the hot water surrounding the container. This final application of heat and pressure serves to finally harden the material of the container and to form strong joints and splices.

Figure 6:
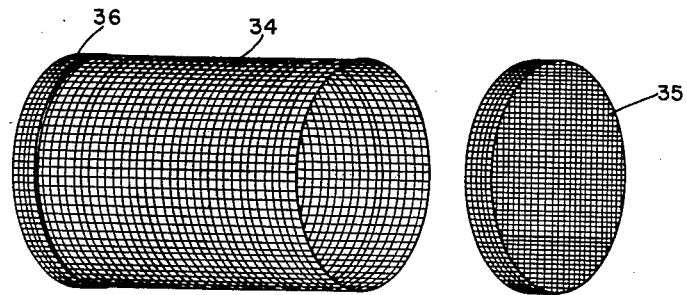
Figure 6 is a perspective of a wire skeleton of a container according to Method 3 above described.
Figure 7:
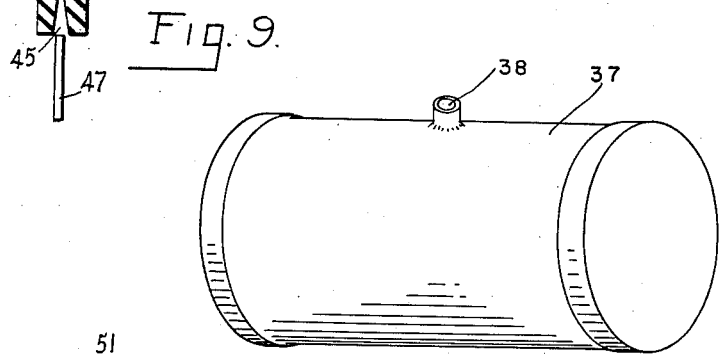
Figure 7 is a perspective view of the finished container according to the method of Figure 6.

Still another method for fabricating a container of this invention comprises forming the same from a sheet of uncoated foraminated metal as shown in Figure 6; subjecting the container thus formed to a solution of rubber having the desired properties by spraying, immersing, filling and draining, or any other suitable means of coating the surfaces and filling the interstices of the metallic member; and then vulcanizing the whole. The term "vulcanization" employed here and elsewhere in this disclosure is meant to include the methods of press, open steam, hot air and room temperature curing. In this method the band 34 and caps 35 and 36 may be shaped by pressing or other means well known in the metalworking art. Once formed, these components may be connected by spot welding, stitching, or other means. One cap, say 35, may be left off until after the interior is coated with the rubber solution. In lieu of this, an opening may be left in the band or one of the caps so that after the exterior is coated, the interior may be filled with the desired rubber solution and so drained that a film of the same is left coating the interior. The opening may then be used for the insertion of a filler cap or pouring spout as shown at 23 in Figure 2 and 38 in Figure 7.

This method provides an integral container 37 having a smooth surface, unbroken by fasteners or joints, similar to that of the container fabricated from unvulcanized rubber sheeting. This procedure is especially adapted to the construction of containers having relatively small foraminations in that the same may be readily closed with a very thin coating of the rubber solution with a resultant savings in rubber, weight, and cost. Where a reinforcing metal having larger foraminations is necessary, or where a heavier protective rubber surface is desired, one surface of metal may be coated with a rubber layer of unvulcanized or partially vulcanized rubber prior to the coating of the other by spraying or immersing.

In the methods above described wherein the parts of the container are assembled before final vulcanization of the surface layers, extruded channels or gaskets of an unvulcanized rubber or resinous composition such as are shown in Figures 8, 9, and 10 may be used for connecting the various components of the container. As shown in Figure 8, in constructing a container according to the last described Method No. 3, the edges 39 and 40 of the sheet material forming the band 34 illustrated in Figure 6 may be joined to form a cylindrical closure by their insertion into channels 41 and 42 respectively of the extruded unvulcanized rubber gasket 43. This joint is then coated with the rubber-like solution by spraying or other means disclosed, and the gasket 43 and the rubber coating on the metal are vulcanized into one unitary mass to form a joint having the strength, imperviousness and corrosion resistance of the remainder of the container.

The gasket 44 of Figure 9 is provided with angularly disposed annular cavities 45 and 46 adapted to receive edges 47 and 48 of sheets of unvulcanized rubber coated foraminous metal and to join them in angular relation. The recesses 45 and 46 may be inwardly convergent as shown so as to form a wedging engagement with edges 47 and 48 upon their insertion to hold them securely until they are integrally united by vulcanization.

The gasket 49 of Figure 10 is a typical form for joining the edges of the cap 51 and the band 50 of the container. This type of gasket may also be used for joints similar to that shown in Figure 8 where excessive normal stresses will be encountered. The joint of Figure 10 will offer greater resistance to such normal stresses since the strips 50 and 51 overlap, whereas the metallic strips in Figure 8 are separated by a portion of rubber which has no metallic reinforcement. It is, of course, possible to increase the strength of the gaskets of the type shown in Figures 8, 9 and 10 and of the joints formed therewith by forming these gaskets from rubber compounds having a relatively high content of reinforcing filler in the form of textile fibers, resinous reinforcers, or the like.

To improve the rigidity of the container manufactured according to any of the above-described methods, we have found it desirable to apply a rubber cement or other adhesive material to the metallic reinforcing core prior to the application of the rubber composition. This adhesive material strengthens the bond between the metal and rubber so as to negative a tendency of the metal to cut through the rubber upon flexing of the material. Because the various laminae of rubber and metal are thus held in fixed transverse relation, a sheet of the composite material thus formed must flex as a whole so that the effective thickness resisting any flexure is at a maximum.

Having thus described our invention in considerable detail, we wish it to be understood that the examples and embodiments shown herein are for descriptive purposes only and do not limit the scope of this invention as more particularly defined by the subjoined claims.

We claim:

1. In a method of the manufacture of containers of the type herein described, forming side wall and top and bottom end cap members from a sheet of expanded metal, assembling and joining these members by inserting their edges to be joined in preformed channeled gaskets of vulcanizable rubber, coating the surfaces of the container thus assembled with a rubber composition and subjecting the assembly thus formed to vulcanizing conditions.

2. In a method of the manufacture of containers of the type herein described, forming side wall and top and bottom end closure members from a rubber coated expanded metal, assembling and joining these members by inserting their edges to be joined in preformed channeled gaskets of partially vulcanized rubber and subjecting the assembly thus formed to vulcanizing conditions.

3. A method of manufacturing containers comprising forming side wall and end members from sheets of expanded metal, applying a layer of rubber material upon at least one broadside surface of each of said members, assembling and joining these members of rubber coated expanded metal by inserting their edges to be joined in preformed channeled gaskets of vulcanizable material and subjecting the assembly thus formed to vulcanizing conditions of heat and pressure whereby the rubber material will be forced into the foramens of the expanded metal and at the same time will become vulcanized and integrally united to the channels or gaskets with which the edges of said members of rubber coated expanded metal are in contact.

4. A method of manufacturing containers of the type herein described comprising placing a sheet of expanded metal and a sheet of unvulcanized rubber superimposed thereon within a pressure mold, individually forming a side wall member within said mold, placing a second sheet of expanded metal and a second sheet of unvulcanized rubber superimposed thereon within said mold and forming therein an end closure member, assembling and joining these members by inserting their edges to be joined in preformed channeled gaskets of vulcanizable rubber, and subjecting the assembly thus formed to vulcanizing conditions.

5. A method of manufacturing containers of the type herein described comprising forming a side wall and at least one end cap member from a sheet of foraminous metal, assembling and joining these members by inserting their edges to be joined in preformed channeled gaskets of vulcanizable rubber, coating the surfaces of the container thus assembled with a rubber composition and subjecting the assembly thus formed to vulcanizing conditions.

6. A method of manufacturing containers of the type herein described comprising forming a side wall and at least one end closure member from a rubber coated foraminous metal, assembling and joining these members by inserting their edges to be joined in preformed channeled gaskets of partially vulcanized rubber and subjecting the assembly thus formed to vulcanizing conditions.

7. A method of manufacturing containers of the type herein described comprising pressing together sheets of rubber and foraminous metal to force the rubber through the foramens and over at least one surface of the metal sheet, shaping the composite sheets thus formed to make a side wall and end closure members, assembling and joining these members by inserting their edges to be joined in preformed channeled rubber gaskets to form an air-tight closure, placing the closure with its interior exposed to a controlled supply of compressed air in hot water under pressure, and controlling the air compression within the closure to maintain a pressure differential between the inside and outside of the container during the final vulcanization.

References Cited in the file of this patent

UNITED STATES PATENTS

| Number | Name | Date |
|---|---|---|
| 417,242 | Haas | Dec. 17, 1889 |
| 844,070 | Weida | Feb. 12, 1907 |
| 1,285,537 | Wolf | Nov. 19, 1918 |
| 1,297,994 | Boyer | Mar. 25, 1919 |
| 1,506,288 | Brucker | Aug. 26, 1924 |
| 1,844,512 | Mains | Feb. 9, 1932 |
| 1,859,799 | Rix | May 24, 1932 |
| 1,999,598 | Levine | Apr. 30, 1935 |
| 2,026,996 | Raflovich | Jan. 7, 1936 |
| 2,108,722 | Miedel | Feb. 15, 1938 |
| 2,153,184 | Hagen | Apr. 4, 1939 |
| 2,357,246 | Whitmeyer | Aug. 29, 1944 |
| 2,401,625 | Eger | June 4, 1946 |
| 2,406,742 | Cooper | Sept. 3, 1946 |
| 2,427,639 | Weida | Sept. 16, 1947 |
| 2,429,993 | Crosby | Nov. 4, 1947 |
| 2,477,267 | Robinson | July 26, 1949 |
| 2,489,541 | Read | Nov. 29, 1949 |
| 2,508,906 | Cunningham et al. | May 23, 1950 |
| 2,593,714 | Robinson | Apr. 22, 1952 |
| 2,626,885 | Gollings | Jan. 27, 1953 |

FOREIGN PATENTS

| Number | Country | Date |
|---|---|---|
| 339,320 | Great Britain | Dec. 4, 1930 |
| 357,327 | Great Britain | Sept. 24, 1931 |
| 481,327 | Great Britain | Mar. 9, 1938 |